(12) United States Patent
Newman et al.

(10) Patent No.: US 11,848,530 B2
(45) Date of Patent: Dec. 19, 2023

(54) RADIO-FREQUENCY EXCITED GAS LASER

(71) Applicant: Coherent, Inc., Santa Clara, CA (US)

(72) Inventors: Leon A. Newman, Windsor, CT (US); Michael Leigh Ermold, South Hadley, MA (US); James Hyland, Madison, CT (US); Thomas V. Hennessey, Jr., Lebanon, CT (US); Lanny Laughman, Bolton, CT (US)

(73) Assignee: Coherent, Inc., Santa Clara, CA (US)

( * ) Notice: Subject to any disclaimer, the term of this patent is extended or adjusted under 35 U.S.C. 154(b) by 406 days.

(21) Appl. No.: 17/161,464

(22) Filed: Jan. 28, 2021

(65) Prior Publication Data
US 2021/0242650 A1    Aug. 5, 2021

Related U.S. Application Data

(60) Provisional application No. 62/970,475, filed on Feb. 5, 2020.

(51) Int. Cl.
| | | |
|---|---|---|
| *H01S 3/03* | (2006.01) | |
| *H01S 3/038* | (2006.01) | |
| *H01S 3/097* | (2006.01) | |
| *H01S 3/223* | (2006.01) | |

(52) U.S. Cl.
CPC ............ *H01S 3/038* (2013.01); *H01S 3/0315* (2013.01); *H01S 3/09702* (2013.01); *H01S 3/2232* (2013.01)

(58) Field of Classification Search
CPC .......... H01S 3/0315; H01S 3/03; H01S 3/038; H01S 3/0323; H01S 3/032; H01S 3/2232
See application file for complete search history.

(56) References Cited

U.S. PATENT DOCUMENTS

| | | |
|---|---|---|
| 3,889,208 A * | 6/1975 | Itzkan .................. H01S 3/0315 372/1 |
| 4,787,090 A | 11/1988 | Newman et al. |
| 5,610,936 A | 3/1997 | Cantoni |
| 6,192,061 B1 | 2/2001 | Hart et al. |
| 6,256,332 B1 | 7/2001 | Anikitchev |
| 6,693,944 B1 | 2/2004 | Hug et al. |
| 6,788,722 B1 | 9/2004 | Kennedy et al. |

(Continued)

FOREIGN PATENT DOCUMENTS

WO    WO-2009105174 A2    8/2009

OTHER PUBLICATIONS

International Search Report and Written Opinion for International Patent Application No. PCT/US2021/015120, dated Jun. 23, 2021, 15 pages.

*Primary Examiner* — Xinning(Tom) Niu
*Assistant Examiner* — Delma R Fordé
(74) *Attorney, Agent, or Firm* — Morrison & Foerster LLP

(57) ABSTRACT

A radio-frequency excited carbon dioxide ($CO_2$) or carbon monoxide (CO) gas laser includes two electrodes, which have passivated surfaces, within a sealed housing. Features in a ceramic slab or a ceramic cylinder located between the electrodes define a gain volume. Surfaces of the ceramic slab or the ceramic cylinder are separated from the passivated surfaces of the electrodes by small gaps to prevent abrasion thereof. Reducing compressive forces that secure these components within the housing further reduces abrasion, thereby extending the operational lifetime of the gas laser.

24 Claims, 11 Drawing Sheets

(56) References Cited

U.S. PATENT DOCUMENTS

| | | |
|---|---|---|
| 6,983,001 B2 | 1/2006 | Sukhman et al. |
| 7,263,116 B2 | 8/2007 | Shackleton et al. |
| 2012/0281728 A1 | 11/2012 | DeMaria et al. |
| 2019/0280448 A1* | 9/2019 | Mueller ................ H01S 3/0315 |
| 2021/0242650 A1* | 8/2021 | Newman ............... H01S 3/2232 |

* cited by examiner

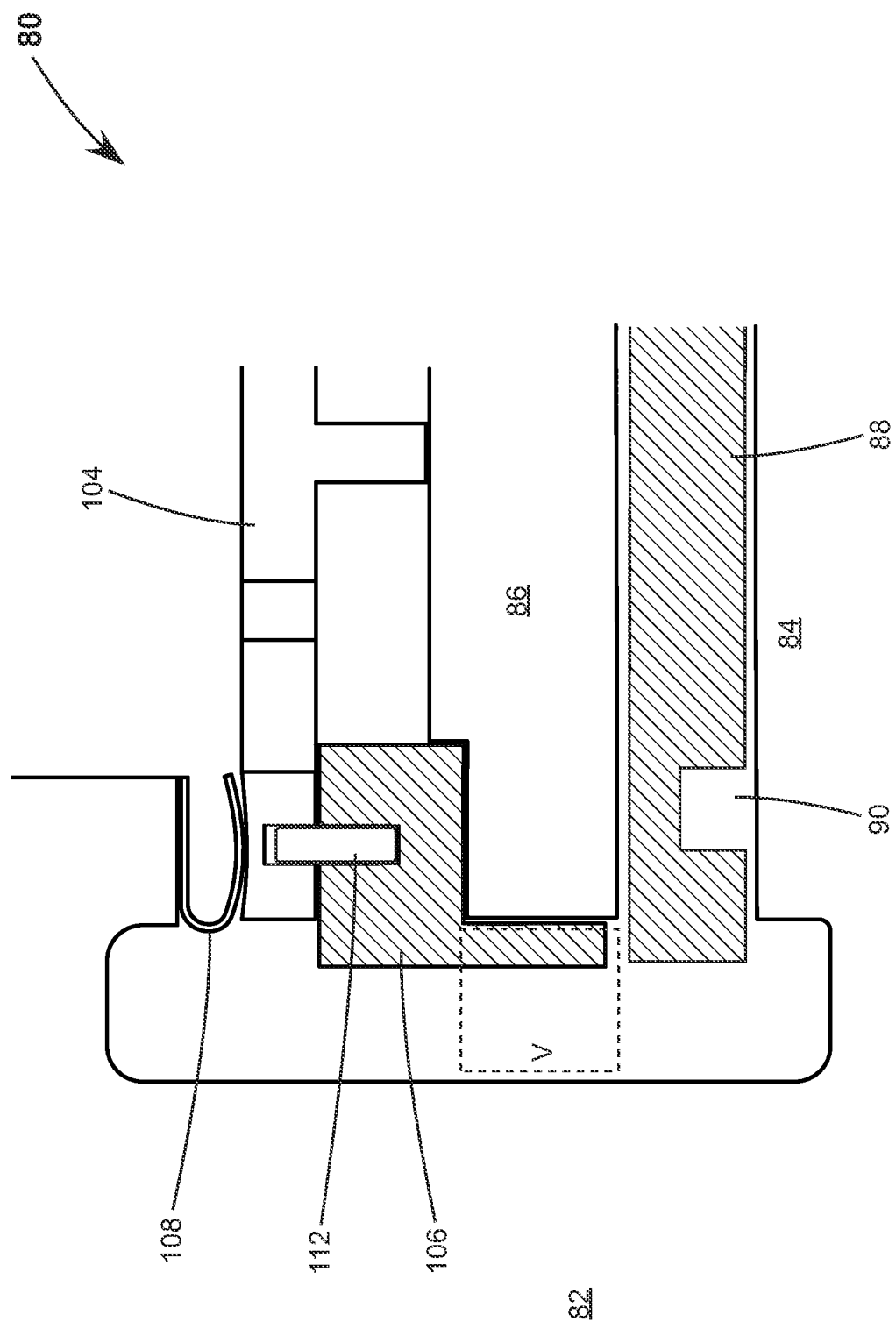

RADIO-FREQUENCY EXCITED GAS LASER

PRIORITY

This application claims priority to U.S. Provisional Patent Application Ser. No. 62/970,475 filed on 5 Feb. 2020, the disclosure of which is incorporated herein by reference in its entirety.

TECHNICAL FIELD OF THE INVENTION

The present invention relates in general to carbon dioxide ($CO_2$) and carbon monoxide (CO) gas lasers. The invention relates in particular to radio-frequency (RF) excited $CO_2$ and CO gas lasers having a ceramic component to confine the RF excited gas.

DISCUSSION OF BACKGROUND ART $CO_2$ lasers have been used for decades in industrial processes, wherein the infrared (IR) wavelength and relatively high power of a $CO_2$ laser is advantageous. The lasing medium is a gas discharge in a $CO_2$ gas mixture. The gas mixture typically includes 10% to 20% $CO_2$ and is maintained at less than one atmosphere of pressure. The gas mixture is energized to generate the gas discharge by applying an electric current or a RF field between two electrodes. $CO_2$ lasers can deliver output laser radiation at infrared wavelengths within a range from about 9 micrometers ($\mu m$) to about 11 $\mu m$. Recently, CO lasers have been commercialized that deliver output laser radiation at shorter infrared wavelengths, over a range from about 5.2 $\mu m$ to about 6.0 $\mu m$.

A gas laser may be configured as a waveguide laser or a slab laser. In a waveguide gas laser, the gas discharge is established within a long and comparatively narrow waveguide. A laser resonator is formed around the energized gas mixture by resonator mirrors, located at each end of the waveguide, that direct laser radiation in a longitudinal direction. The narrow waveguide constrains one or more laser-radiation modes in two mutually-orthogonal transverse directions. Laser radiation is amplified by stimulated emission during multiple passes through the gas discharge. $CO_2$ and CO waveguide lasers are capable of providing an inherently high-quality output beam, with good power and wavelength stability, but at relatively low average powers. Typically, at an average power less than about 150 Watts (W). Such a waveguide $CO_2$ laser is described in U.S. Pat. Nos. 6,192,061 and 6,788,722, each thereof owned by the assignee of the present invention and the complete disclosure of each is hereby incorporated herein by reference.

In a slab gas laser, the gas discharge is established in a volume between flat wave-guiding surfaces of two closely-spaced electrodes. A laser resonator is formed around the energized gas mixture by two resonator mirrors. In one transverse direction, the small gap ("discharge-gap") between the two electrodes defines a waveguide that constrains laser-radiation modes. In the orthogonal transverse direction, the resonator mirrors typically define an unstable laser resonator. Laser radiation exits the unstable laser resonator as an approximately collimated beam, passing through a hole in one of the resonator mirrors or passing by an outside edge of one of the resonator mirrors. Such a slab $CO_2$ laser is described in U.S. Pat. Nos. 6,256,332 and 7,263,116, each thereof owned by the assignee of the present invention and the complete disclosure of each is hereby incorporated herein by reference.

Slab $CO_2$ and CO lasers are capable of delivering an output beam at an average power of up to about 8 kilowatts (kW). However, the output beam inherently has an elongated cross-section. Additional beam-conditioning optics are required to transform the output beam into a more useful cross-sectional shape. For example, into a circular shape. Slab $CO_2$ lasers are usually operated in a pulsed mode, delivering pulses of laser radiation having high peak powers. High-power waveguide or slab gas lasers require water cooling or forced-air cooling to remove waste heat.

One early configuration, illustrated in FIG. 1A, for waveguide gas lasers confined the gas discharge in a glass or ceramic tube that is sandwiched between two shaped electrodes. Another common waveguide configuration, illustrated in FIG. 1B, confines the gas discharge in a channel machined into a rectangular ceramic plate that is sandwiched between two flat electrodes. In both these configurations, the waveguide can be folded using mirrors to increase the gas-discharge volume, without significantly increasing the overall size of the laser. A similar configuration for a slab gas laser is illustrated in FIG. 1C. A thin ceramic plate provides diffusion cooling of the gas and enables scaling of slab gas lasers to kilowatt average powers. U.S. Patent application 2019/0280448, owned by the assignee of the present invention and the complete disclosure of which is hereby incorporated herein by reference, describes several arrangements of high peak power slab $CO_2$ lasers that are conductively cooled through the outside surfaces of the laser housing.

Laser efficiency and responsiveness to changes in RF power depend on the precise concentrations of components in the gas mixture. In many contemporary industrial lasers, the laser housing is "sealed", meaning there is no circulating gas continuously replenishing the gas-discharge volume. Such sealed lasers are smaller, simpler, and require less maintenance. These lasers use passivated metals inside the housing; for example, electrodes made of passivated aluminum. A stable passivation layer on a metal surface prevents depletion of atomic and molecular oxygen created by the dissociation of excited $CO_2$ or CO molecules. This oxygen would otherwise form a metal oxide on an exposed surface, thereby reducing the $CO_2$ or CO concentration in the gas mixture.

One disadvantage of the configurations described above having a ceramic tube or ceramic plate sandwiched between metal electrodes is that friction therebetween can remove the passivation layer from the electrodes. This friction is caused by differential thermal expansion and contraction in response to changes in applied RF power. In CO lasers, the oxygen and $CO_2$ depletion occurs at a rate that is slow enough to regard the degraded laser performance as a nuisance that can be partially overcome by increasing the RF power. However, even a small change of about 0.1% in the CO concentration in a CO gas mixture can disable a CO laser.

There is need for a sealed gas laser architecture that has a longer operational lifetime, without compromising the advantages of the metal and ceramic configurations described above. Preferably, this architecture would add minimal cost and complexity.

SUMMARY OF THE INVENTION

In one aspect, a radio-frequency excited gas laser in accordance with the present invention comprises a housing containing the gas, a first electrode elongated along a longitudinal axis, and a second electrode elongated along the longitudinal axis and parallel to the first electrode. The first and second electrodes are located in the housing and are mutually separated by a distance D. A dielectric slab is located between the first and second electrodes that defines a gain volume when the gas is excited by a radio-frequency field. The dielectric slab has opposite first and second surfaces parallel to the first and second electrodes. The first surface of the dielectric slab is substantially separated from the first electrode by a first gap and the second surface of the dielectric slab is substantially separated from the second electrode by a second gap.

In another aspect, a radio-frequency excited gas laser in accordance with the present invention comprises a housing containing the gas. A hollow dielectric cylinder is located in the housing and is oriented along a longitudinal axis. The dielectric cylinder defines a gain volume when the gas is excited by a radio-frequency field. The gain volume is the hollow interior of the dielectric cylinder. A first electrode has a first surface that is concentric with an outside surface of the dielectric cylinder. A second electrode has a second surface that is concentric with the outside surface of the dielectric cylinder. The first and second electrodes are located on opposite sides of the dielectric cylinder. The first surface is separated from the outside surface by a first gap and the second surface is separated from the outside surface by a second gap.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIGS. 8A and 8B are magnified views in a different cross section from FIGS. 6 and 7, schematically illustrating examples of the insulating bar for preventing parasitic discharges and a dowel pin for securing an inductor assembly.

DETAILED DESCRIPTION OF THE INVENTION

Figure 1C:
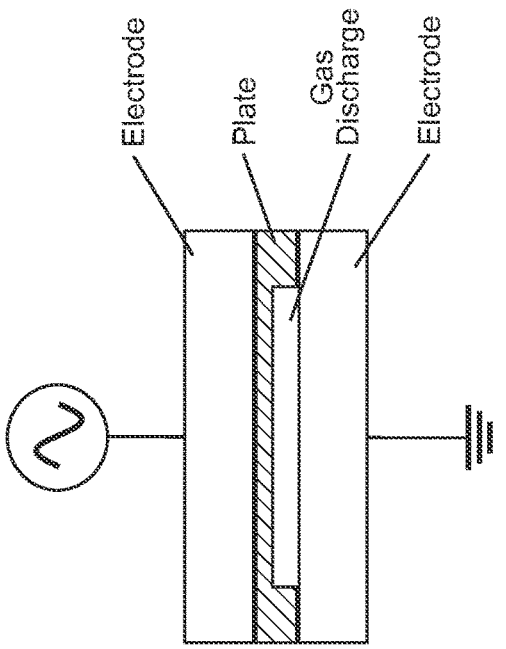
FIG. 1C is a cross-sectional view, schematically illustrating a common slab configuration for a gas laser.
Figure 2:
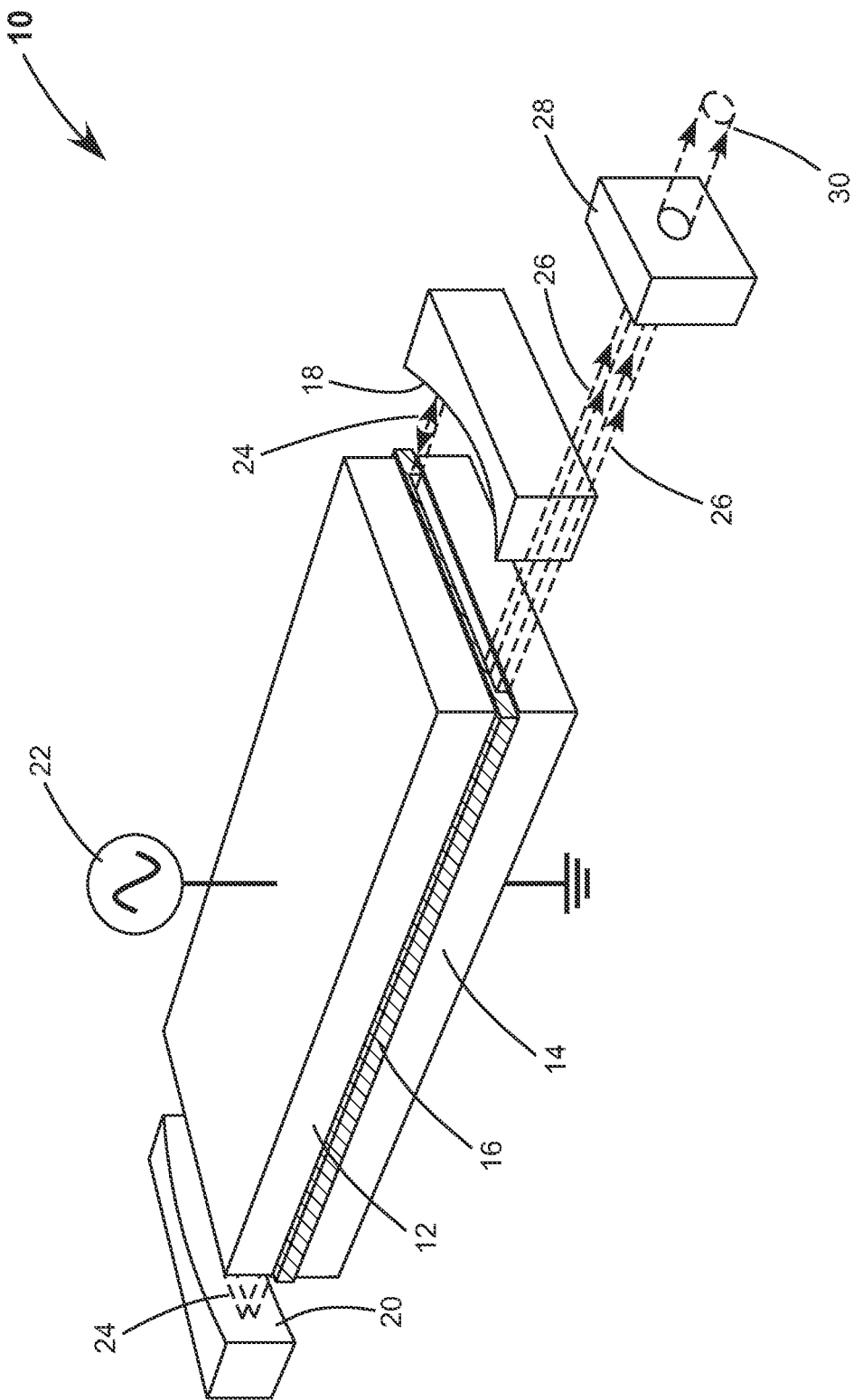
FIG. 2 is a perspective view, schematically illustrating basic features and functions of a prior-art $CO_2$ or CO slab laser.

Referring now to the drawings, wherein like components are designated by like numerals, FIG. 2 is a perspective view, schematically illustrating basic features and function of a prior-art slab $CO_2$ or CO laser 10. Slab laser 10 has the configuration illustrated in FIG. 1C and includes parallel upper and lower electrodes, 12 and 14, that are rectangular in shape. Electrodes 12 and 14 are spaced apart by a ceramic plate 16, defining a discharge gap therebetween. Ceramic plate 16 is highlighted by diagonal shading.

The discharge gap is located in an unstable resonator formed by two concave resonator mirrors 18 and 20. A RF power source 22 is electrically connected to upper electrode 12. Lower electrode 14 is grounded. Typically, the electrodes are located within a gas-tight housing (not shown) that contains the gas mixture. Gas mixtures for $CO_2$ and CO lasers are well-known in the art. Component gases and pressure may vary according to manufacturer preferences and are usually proprietary.

When RF power is applied to upper electrode 12 to energize the gas mixture, a gas discharge is struck in the discharge gap, providing optical gain in the resonator. A hollow machined into ceramic plate 16 confines the excited gas and thereby defines a gain volume. Laser radiation 24 circulates in the resonator, as indicated by dashed lines, and is progressively amplified by the optical gain. The amplified laser radiation illuminates resonator mirrors 18 and 20. A portion thereof spills out of the resonator, past resonator mirror 18, as output laser radiation 26. Output laser radiation 26 forms an expanding beam having a rectangular cross-section. Optional beam-conditioning optics 28 may convert the beam to a more useful form, such as a collimated beam 30 having a circular cross-section. Beam-conditioning optics are typically located outside the gas-tight housing.

Figure 3:
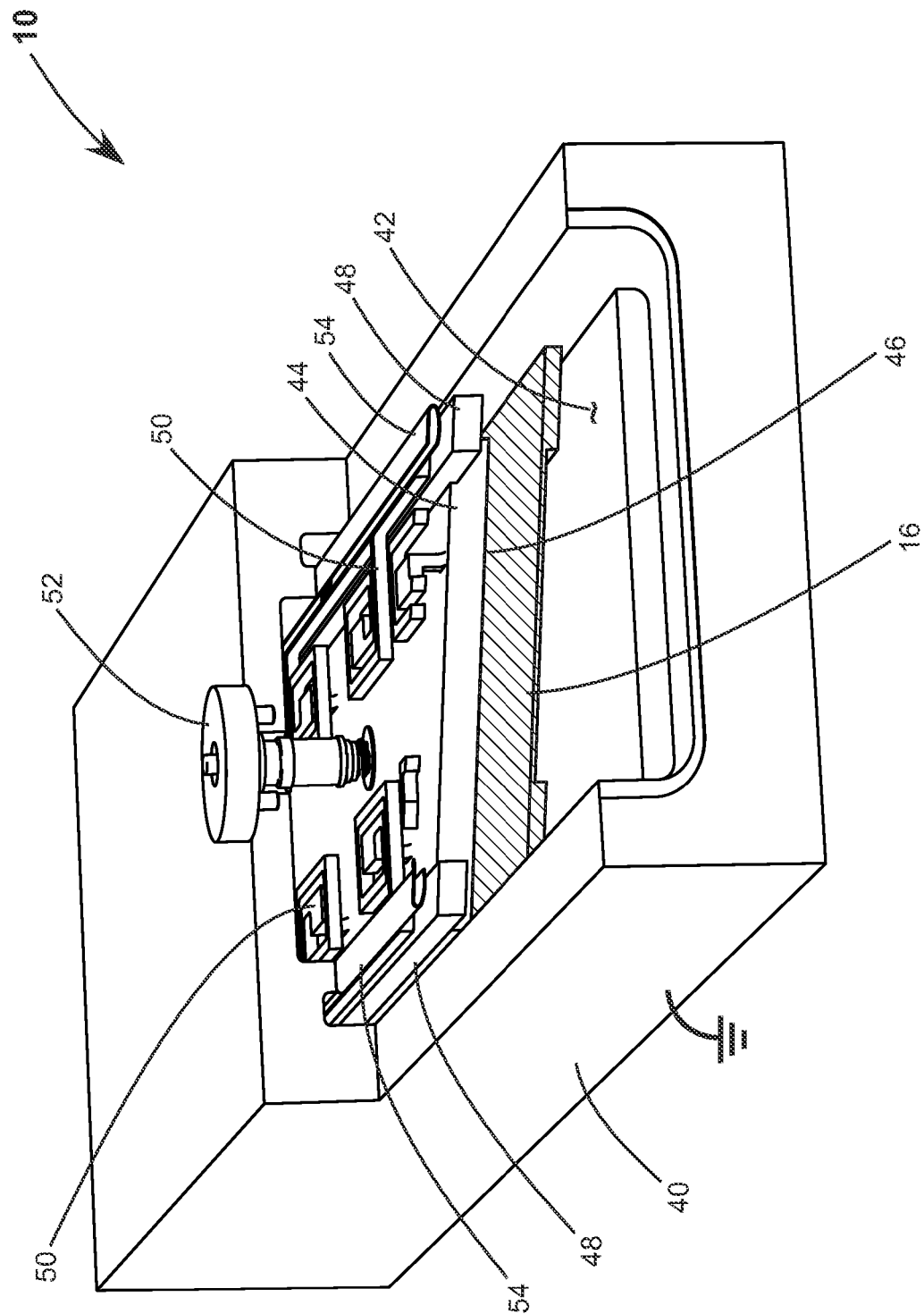
FIG. 3 is a perspective view, partially cut away, schematically illustrating a prior-art $CO_2$ or CO slab laser, including a ceramic plate (shaded) that defines a rectangular gain volume.

FIG. 3 is a perspective view, partially cut away, schematically illustrating an example of slab laser 10. A gas-tight housing includes a hollow metal extrusion 40, partially cut-away to illustrate internal components and their arrangement in the laser. Extrusion 40 is electrically grounded. An end plate (not depicted in the drawing) at each end of the extrusion seals the laser housing. Each end plate incorporates one of the resonator mirrors.

An interior surface 42 of extrusion 40 provides a ground electrode for slab laser 10. Another live electrode 44 having a lower surface 46 is located within extrusion 40. Grounded surface 42 and live surface 46 extend along the length of the extrusion. Live surface 46 is spaced apart from grounded surface 42 by ceramic plate 16. The hollow in the ceramic plate defines a width and height of the gain volume.

A pair of ceramic insulator bars 48 electrically isolate live electrode 44 from grounded extrusion 40. Insulator bars 48 also support an inductor assembly 50, which includes a plurality of inductors to homogenize the gas discharge throughout the gain volume. An electrical feed-through 52 connects RF-power from the RF power source to live electrode 44. Feed-through 52 is electrically connected to live electrode 44 and is electrically isolated from grounded extrusion 40. Inductor assembly 50 is electrically connected to extrusion 40 through spring strips 54, thereby forming a complete parallel resonant electrical circuit. Spring strips 54 and insulator bars 48 cooperatively retain live electrode 44, ceramic plate 16, and inductor assembly 50 in position within the extrusion. Very strong spring strips, applying a large clamping force, are required to hold all of these components. The clamping force needs to be sufficient to hold these components precisely in position through manufacture, handling, and transport of the slab laser.

Figure 1B:
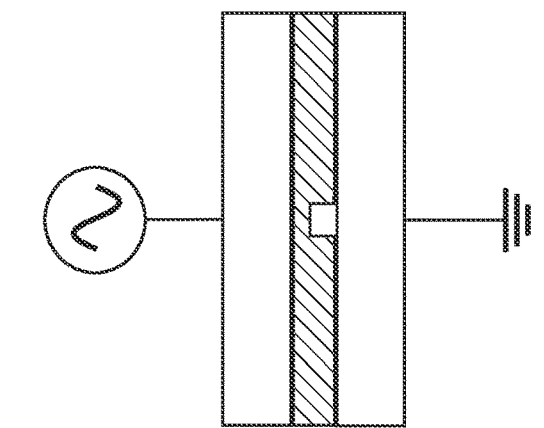
FIGS. 1A and 1B are cross-sectional views, schematically illustrating common waveguide configurations for a gas laser.
Figure 4:
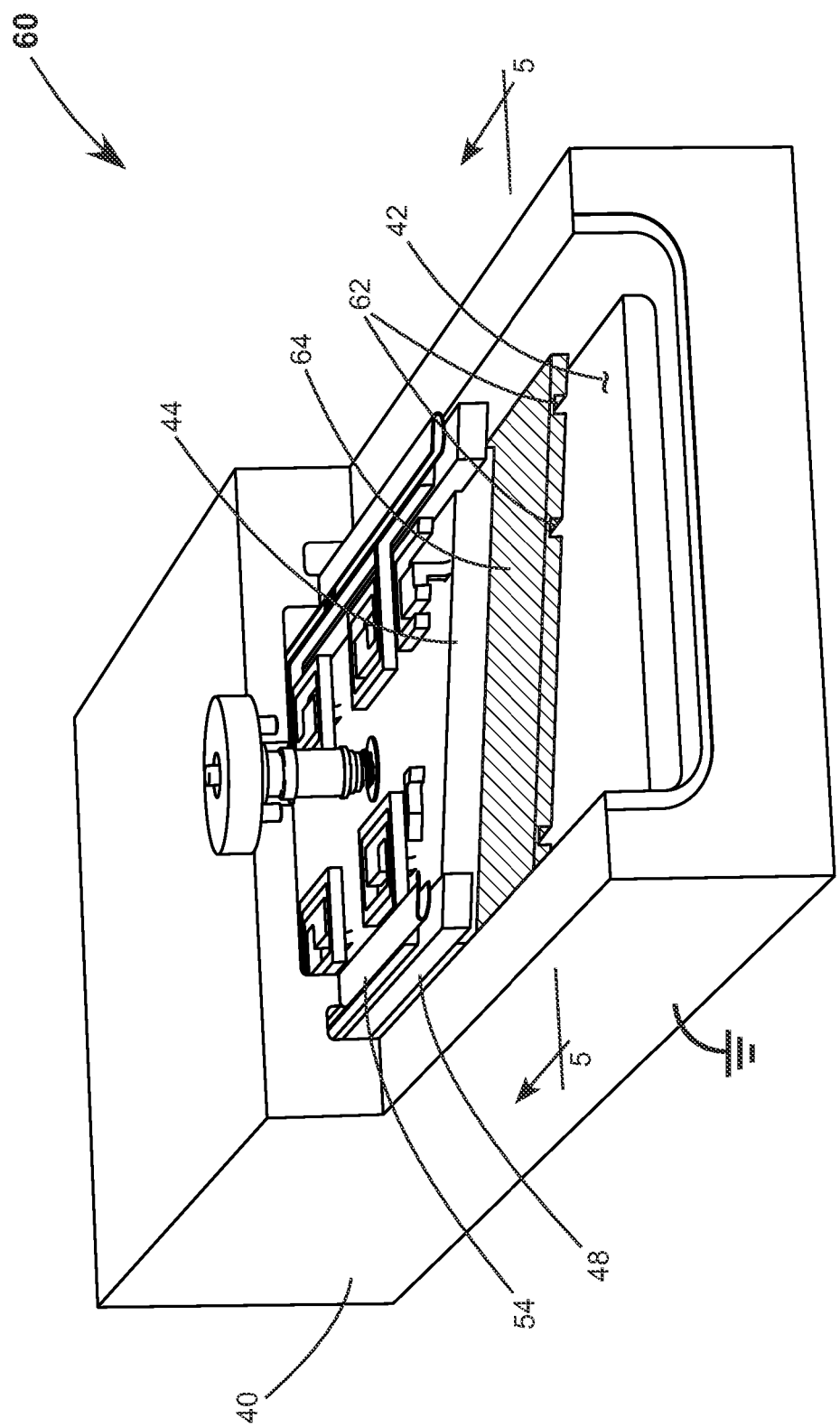
FIG. 4 is a perspective view, partially cut away, schematically illustrating a prior-art $CO_2$ or CO waveguide laser, including a ceramic plate (shaded) having channels that define a gain volume.
Figure 5:
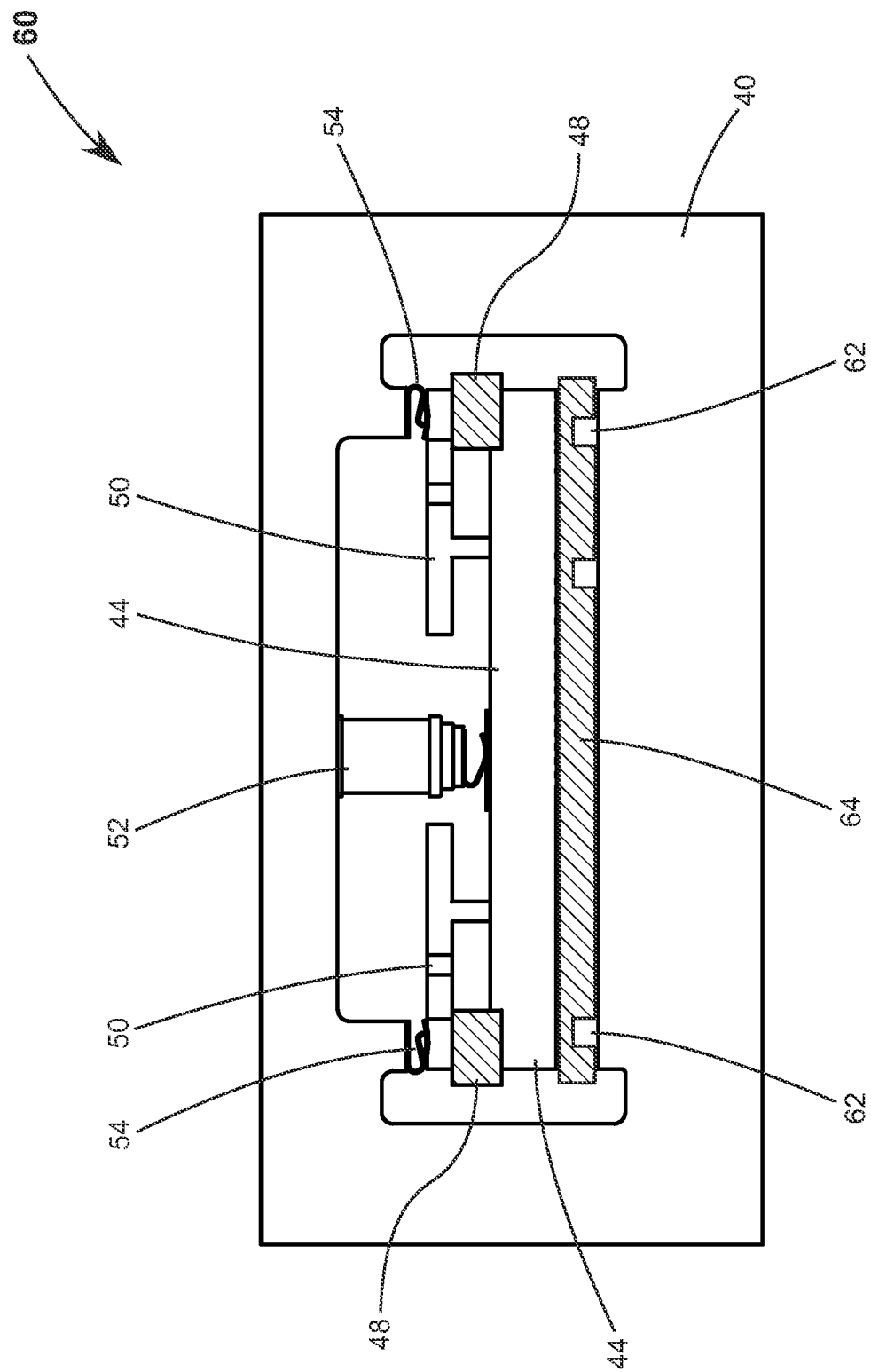
FIG. 5 is a cross-sectional view, seen generally in the direction 5-5 of FIG. 4, further illustrating the prior-art $CO_2$ or CO waveguide laser.

FIG. 4 is a perspective view, partially cut away, schematically illustrating a prior-art waveguide $CO_2$ or CO laser 60. FIG. 5 is a cross-sectional end view of waveguide laser 60, which is folded, and has the configuration illustrated in FIG. 1B. Waveguide laser 60 is similar to slab laser 10, but has channels 62 machined into a ceramic plate 64 that define the waveguide. Channels 62, here, are rectangular in cross-section with sharp corners. These channels may also have rounded corners or be round in cross-section. Otherwise, the arrangement of parts within extrusion 40 is the same. The resonator is formed by two resonator mirrors and two-fold mirrors that are incorporated into end plates (not depicted in the drawings). One resonator mirror is highly reflective at the wavelength of the laser radiation. The other resonator mirror is partially reflective and allows output laser radiation to couple out of the resonator.

Figure 6:
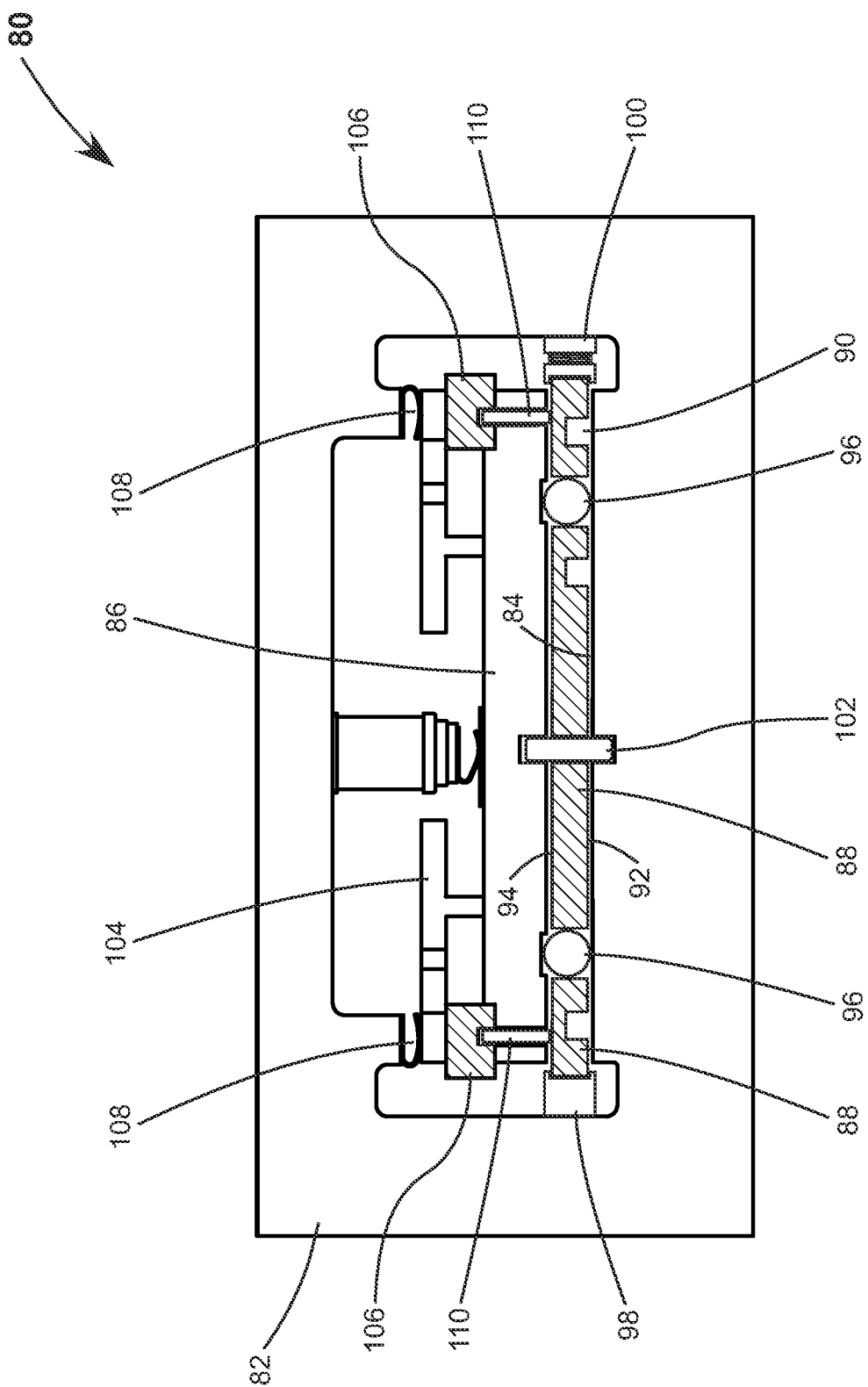
FIG. 6 is a cross-sectional view, schematically illustrating one preferred embodiment of an RF-excited $CO_2$ or CO slab laser in accordance with the present invention, including a ground first electrode that is an interior surface of a housing, a live second electrode, a dielectric slab located therebetween and separated therefrom by first and second gaps, respectively, and a dowel pin for maintaining alignment of the dielectric slab.

FIG. 6 is a cross-sectional end view schematically illustrating one embodiment of RF excited gas laser 80 in accordance with the present invention. Gas laser 80 includes a housing 82 that contains the gas. Here, housing 82 is in the form of a hollow metal extrusion. A first electrode 84 in the form of an interior surface of housing 82 is elongated along a longitudinal axis (perpendicular to the plane of the drawing) of the gas laser. A second electrode 86 is elongated along the longitudinal axis and is parallel to the first electrode. A dielectric slab 88 having machined channels 90 is located between the first and second electrodes. Channels 90 extend along the full length of dielectric slab 88 and are arranged to form a folded waveguide. Channels 90 define a gain volume when the gas is excited by a RF field. The first electrode, the dielectric slab, and the second electrode are located within the housing and are therefore immersed in the gas.

Dielectric slab 88 has a first surface 92 and an opposite second surface 94 that are parallel to the first and second electrodes. First surface 92 is separated from first electrode 84 by a first gap and second surface 94 is separated from second electrode 86 by a second gap. The first and second gaps are created and maintained by precision balls 96, which are located in holes through dielectric slab 88 that are slightly larger in diameter than the precision balls. Each precision ball 96 is in contact with both electrodes and the precision balls are therefore made of an electrically-insulating material. The diameter of precision balls 96 is selected to achieve a desired sum of the separation distances of the first and second gaps. Optional recesses may be machined into second electrode 86 to precisely set these separations, as depicted in the drawing. Alternatively, recesses may be machined into housing 82, or complementary recesses may be machined into both the second electrode and the housing. Dielectric slab 88 is thereby "floating" between the two electrodes and has no mechanical contact therewith.

Efficient operation of gas laser 80 is critically dependent on maintaining precise alignment of dielectric slab 88 with respect to the resonator mirrors and fold mirrors. Lateral alignment is maintained by compressing dielectric slab 88 between registration blocks 98 and preloaded spring assemblies 100 attached to opposite inside surfaces of housing 82. Here, each registration block 98 is paired with a spring assembly 100. At least two pairs are required to secure the dielectric slab within the housing and thereby register the dielectric slab with respect to the mirrors. Preferably, these pairs are located close to each end of the dielectric slab. The dielectric slab may be further secured by additional registration blocks and/or spring assemblies located therebetween.

Longitudinal alignment of dielectric slab 88 is maintained by dowel pins 102, which are located in holes through the dielectric slab and corresponding blind holes in each of the electrodes. At least one dowel pin 102 is required to register the dielectric slab securely with respect to the housing.

Second electrode 86 is secured in the horizontal lateral axis (of the drawing) and the longitudinal axis by dowel pins 102. Terms such as "horizontal" and "vertical" are used herein for convenience of description, but are not meant to limit spatial orientation of the gas laser in operation. At least two dowel pins 102 are required to mechanically constrain second electrode 86 with respect to dielectric slab 88 and housing 82. Preferably, dowel pins 102 would be made of an electrically-insulating material. Preferably, these dowel pins are widely separated relative to the length of second electrode 86. The second electrode may be further secured by additional dowel pins located therebetween.

Figure 7:
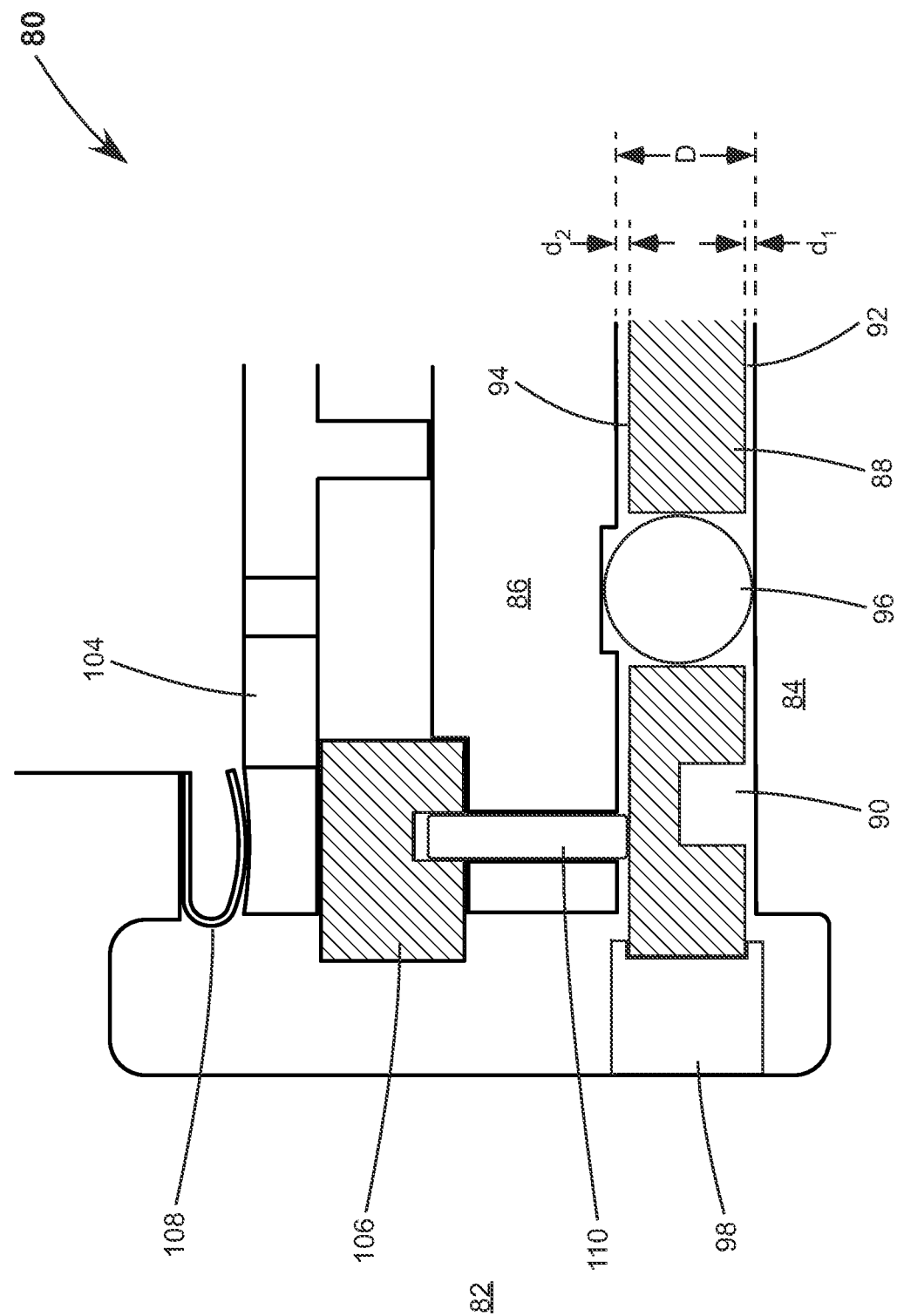
FIG. 7 is a magnified view in the same cross section as FIG. 6, schematically illustrating a precision ball for creating the first and second gaps, a registration block for securing the dielectric slab, a dowel pin for securing an insulating bar, and a spring for providing a controlled force and electrical connection.

An inductor assembly 104, a pair of insulating bars 106, and second electrode 86 are secured in the vertical lateral axis (of the drawing) by the compressive force provided by springs 108. Insulating bars 106 are highlighted by diagonal shading. FIG. 7 is a magnified view, in the same cross-section as FIG. 6, illustrating details of these components in gas laser 80. Springs 108, located on each horizontal lateral side of gas laser 80, push these components against precision balls 96. First electrode 84 and second electrode 86 are mutually separated by a distance D, first surface 92 is separated from first electrode 84 by first gap $d_1$, and second surface 94 is separated from second electrode 86 by second gap $d_2$.

These separations are uniform throughout the whole volume between the parallel electrodes. Preferably, the first gap is at least 0.001 D (0.1% of D) and the second gap is also at least 0.001 D. More preferably, the first gap is at least 0.0025 D (0.25% of D) and the second gap is also at least 0.0025 D. A practical upper limit for each of the first and second gaps is about 0.15 D (15% of D). Distance D between the electrodes would typically be in a range from about 2 mm to about 6 mm. Precision balls 96 having a diameter specified to a tolerance of 2.5 µm or less would achieve sufficient uniformity. Precision balls made of electrically-insulating materials, such as ceramics, are commercially available. For example, from CCR Products LLC of West Hartford, Connecticut.

Here, springs 108 are fingerstock springs that extend longitudinally along the length of the inductor assembly, the insulating bars, and the second electrode. Such fingerstock springs provide a controlled force per unit length and provide an electrical connection between housing 82 and inductor assembly 104. Optional shaped recesses may be machined into the inductor assembly to help secure the fingerstock springs in the inductor assembly, as depicted. Fingerstock springs are commercially available as catalog items, having different cross-sectional shapes and made of different materials.

Insulating bars 106 are secured in the horizontal lateral axis and the longitudinal axis by dowel pins 110, which are located, here, in holes through second electrode 86 and corresponding blind holes in each insulating bar 106. Dowel pins 110 rest on second surface 94 of dielectric slab 88. Alternatively, dowel pins 110 could be located in blind holes in both second electrode 86 and insulating bar 106. At least two dowel pins 110 are required to mechanically constrain each insulating bar 106 with respect to second electrode 86. Preferably, these dowel pins are located towards the ends of each insulating bar. The insulating bars may be further secured by additional dowel pins located therebetween.

FIG. 8A is another magnified view of gas laser 80 in a different cross-section from FIGS. 6 and 7. Inductor assembly 104 is secured in the horizontal lateral axis and the longitudinal axis by dowel pins 112, which are located within blind holes in insulating bars 106 and corresponding blind holes in the inductor assembly. Preferably, a dowel pin 112 is located towards the end of each insulating bar. The inductor assembly may be further secured by additional dowel pins located therebetween.

Insulating bars 106 extend into the volume V (indicated by dashed lines) between second electrode 86 and housing 82 along most of the length thereof. Extending the insulating bars into volume V increases the threshold electric potential for creating undesirable parasitic discharges between the second electrode and the housing. In gas laser 80, capacitance across first gap $d_1$ and second gap $d_2$ necessitates a higher applied RF power to strike a discharge in the gain volume and to couple a given power into the gas plasma therein. Extending the insulating bars mitigates parasitic discharges that might otherwise be struck by this higher RF power.

Figure 8B:
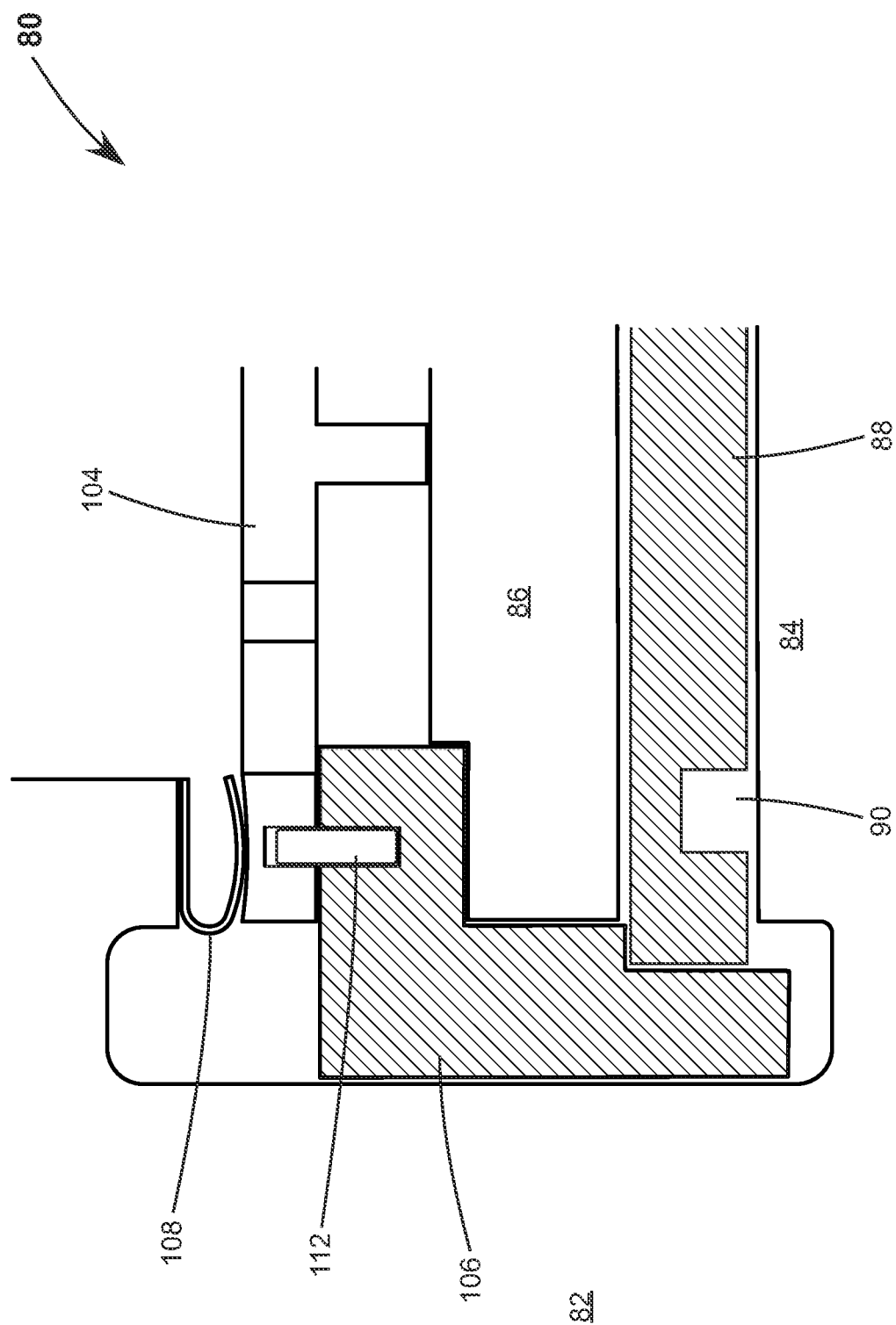

FIG. 8B is a magnified view of gas laser 80 in the same cross section as FIG. 8A, but schematically illustrating another example of insulating bar 106 that was found to be even more effective at preventing parasitic discharges. The insulating bar of FIG. 8B occupies most of the volume V between the second electrode and the housing. However, insulating bar 106 is still separated from both housing 82 and second electrode 86. Avoiding physical contact between the insulating bar and metal surfaces of the housing and the second electrode prevents chaffing of the metal surfaces, which in-turn prevents depletion of oxygen from the gas mixture.

Housing 82, which includes first electrode 84, and second electrode 86 are preferentially made of a passivated metal. For example, made of a self-passivating aluminum alloy or an anodized aluminum alloy. Dielectric slab 88 is preferably made of a ceramic material having a relatively-high thermal conductivity. For example, made of aluminum nitride (AlN), aluminum oxide ($Al_2O_3$), or beryllium oxide (BeO). Insulating bars 106 and dowel pins 102 are also preferably made of a ceramic material. Indeed, dielectric slab 88, insulating bars 106, precision balls 96, and dowel pins 102 could all be made of the same ceramic material, such as aluminum oxide.

Figure 9:
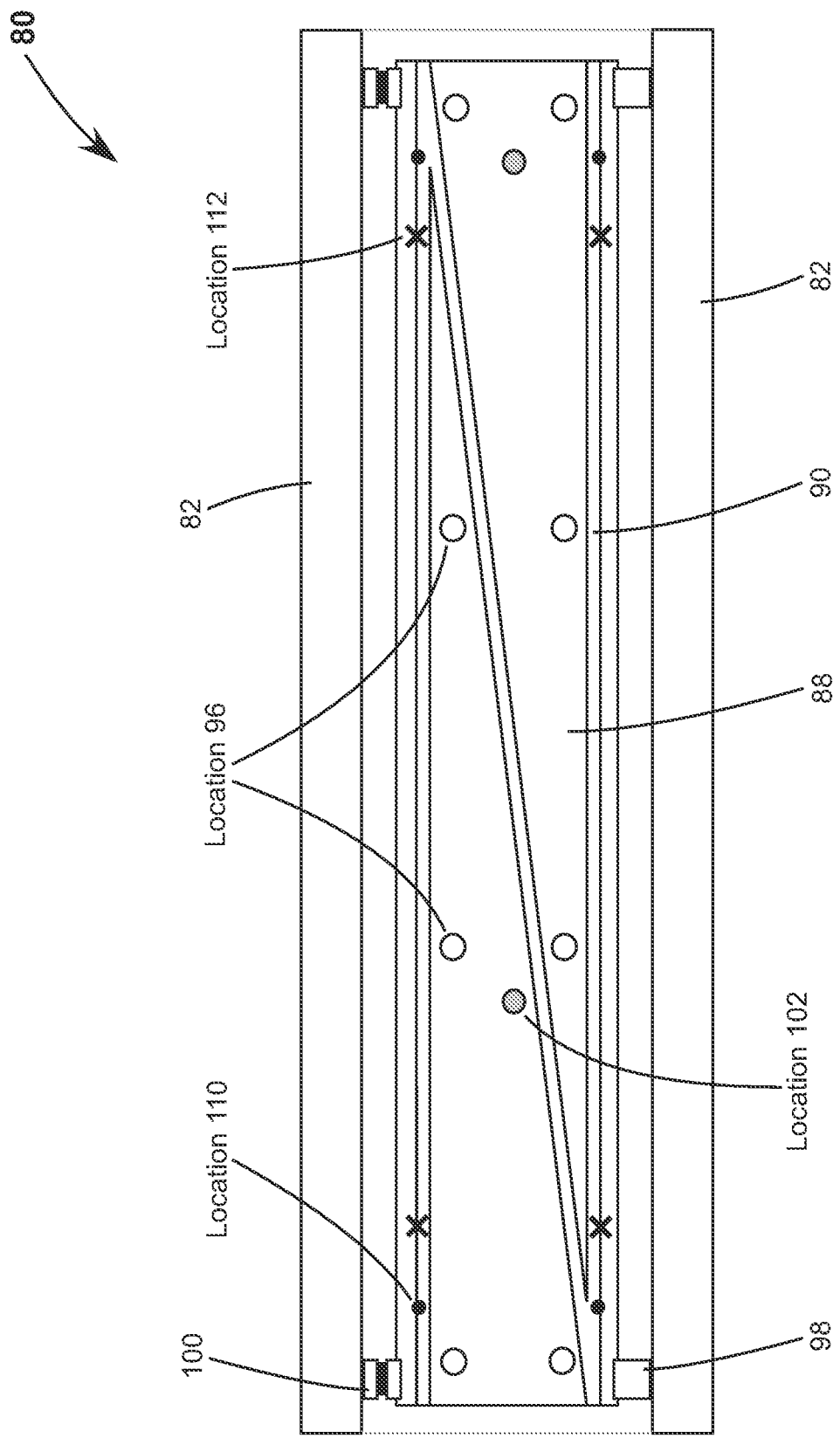
FIG. 9 is a cross-sectional plan view the inventive slab laser of FIGS. 6-8B, schematically illustrating exemplary locations of the precision balls, registration blocks, and dowel pins.

FIG. 9 is a cross-sectional plan view of gas laser 80 schematically illustrating exemplary locations of registration blocks 98, spring assemblies 100, precision balls 96 and dowel pins 102 with respect to dielectric slab 88. In the example depicted, eight precision balls 96 are located in holes (open circles) distributed across the dielectric slab to ensure first gap $d_1$ and second gap $d_2$ are uniform. Two dowel pins 102 are located in holes (shaded circles) widely separated along the length of the dielectric slab. Four dowel pins 110 rest on second surface 94 of dielectric slab 88 at the exemplary locations indicated by filled circles. Four dowel pins 112 captured within insulating bars 106 and inductor assembly 104 are proximate to the exemplary locations indicated by diagonal crosses.

One advantage of the inventive gas laser, which has a small gap between the dielectric slab and each electrode, over prior-art gas lasers is that the surfaces of the dielectric slab cannot scrape the passivation layers from the surfaces of the electrodes. Each electrode has just one point of contact with each precision ball. As the surfaces of the dielectric slab and the electrodes move with respect to each other due to differential thermal expansion and contraction, the precision balls are essentially bearings that roll on the passivated surfaces of the electrodes with minimal scraping.

Another advantage of the inventive gas laser is that inductor assembly 104, insulating bar 106, and second electrode 86 are secured in two axes by dowel pins 110 and dowel pins 112. These components are secured in the other axis by a relatively modest compressive force provided by spring 108. Prior-art designs relied on static friction between surfaces in mutual contact to secure such components and therefore required a much stronger compressive force. Reducing this compressive force prevents deformation of the electrodes by the precision balls and minimizes friction between the precision balls and the electrodes.

In the inventive gas laser, the compressive force must be sufficient to secure components in place and prevent movement of the dielectric slab with respect to the resonator mirrors due to mechanical shocks and vibrations. By way of example, the compressive force was measured to be between 65 Newton (N) and 105 N in different arrangements of the inventive laser. In equivalent prior-art arrangements, the required compressive force was measured to be between 525 N and 1050 N.

The relatively modest compressive forces required to secure components of the inventive laser enables embodiments having some contact between surfaces of the dielectric slab and the electrodes, because of the reduced friction therebetween. Gas laser 80 described above has no such contact and essentially eliminates scraping of passivation layers on the surfaces of the electrodes. However, embodiments wherein the dielectric slab is substantially separated from each electrode by a gap may reduce depletion rates of components in the gas mixture sufficiently to achieve a desired operational lifetime. Herein, "substantially separated" means at least 75% of the mutually-facing surfaces of the dielectric slab and the electrode are not in contact, and higher fractions will further minimize depletion rates. A fraction of at least 85% is more preferable and a fraction of at least 95% is even more preferable.

The inventors constructed and tested an inventive gas laser having the folded waveguide configuration depicted in FIGS. 6-8. Gap distances $d_1$ and $d_2$ were approximately 50 μm. The housing was sealed and contained a CO gas mixture. The power of the inventive test laser was cycled on and off periodically over an extended time that simulated typical industrial use conditions for such a laser. The inventive test laser maintained average powers above a target minimum without any gas replacement. Another test laser having an equivalent prior-art arrangement required two gas refills over the same time and under the same conditions to maintain the same target average power.

The inventive gas laser is described above having the waveguide configuration of FIG. 1B. The inventive gas laser may also have the slab configuration of FIG. 1C. Channels 90 machined into dielectric slab 88 of gas laser 80 would be replaced by a laterally extended hollow that defines a gain volume when the gas is excited by an RF field. Precision balls 96 and dowel pins 102 would be located within dielectric slab 88, but outside of the hollow, so as not to interrupt laser radiation circulating through the gain volume therein.

Figure 1A:
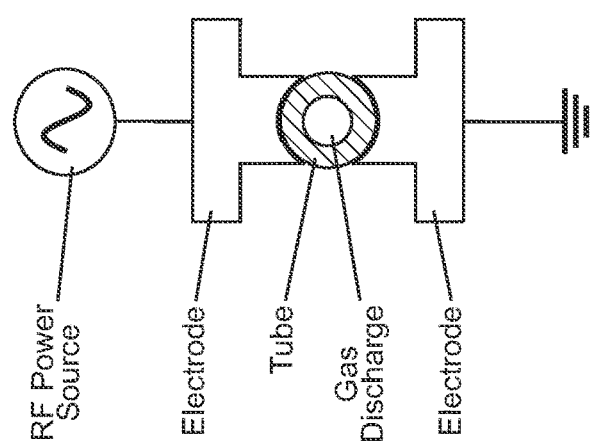
Figure 10:
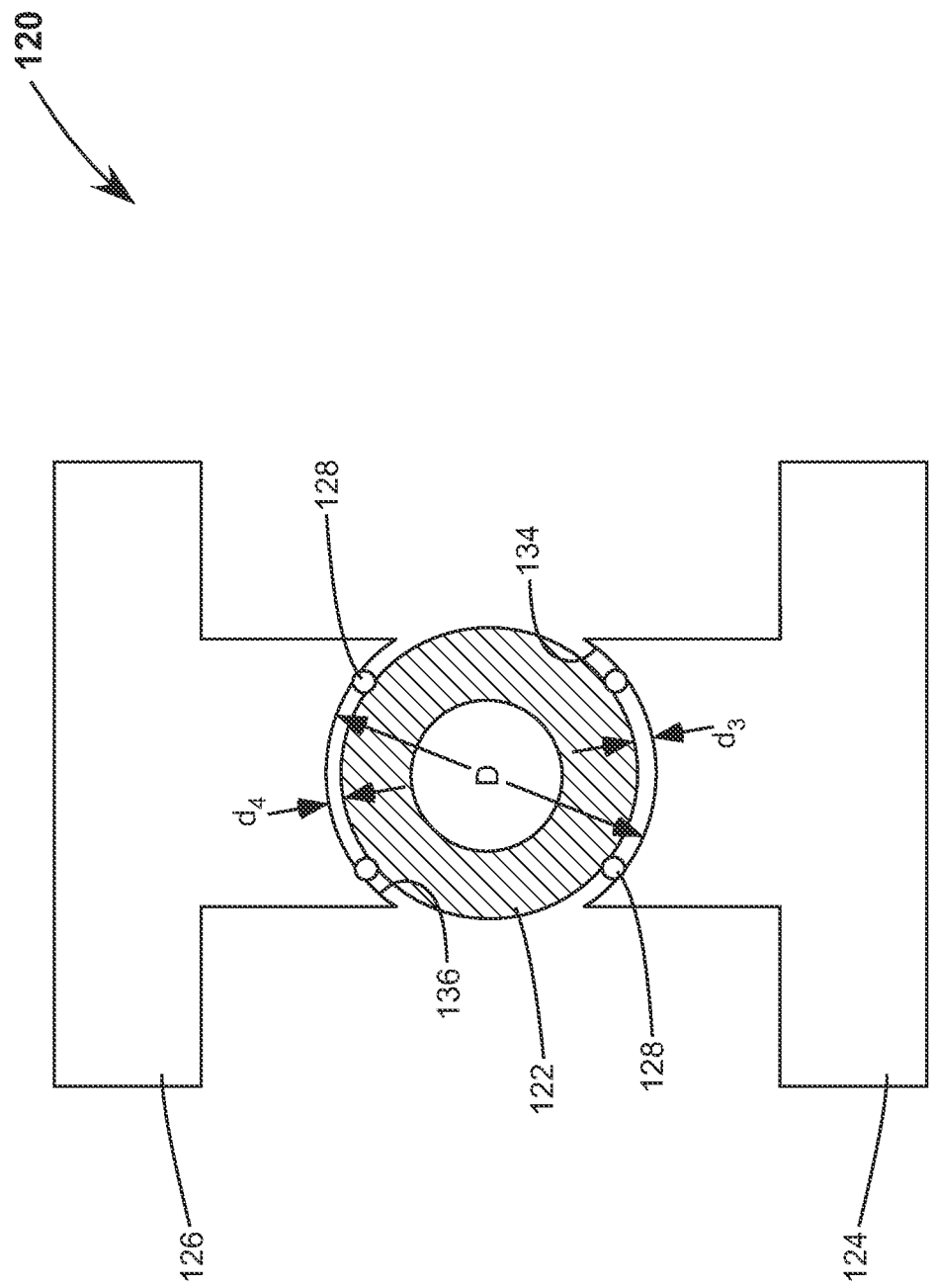
FIG. 10 is a cross-sectional view, schematically illustrating one preferred embodiment of an RF-excited $CO_2$ or CO waveguide laser in accordance with the present invention, including first and second electrodes and a hollow dielectric cylinder located therebetween and separated therefrom by first and second gaps, respectively.

The inventive gas laser may also have the waveguide configuration of FIG. 1A. FIG. 10 is a cross-sectional end view schematically illustrating another embodiment of RF excited gas laser 120 in accordance with the present invention. A hollow dielectric cylinder 122 is oriented along the longitudinal axis of gas laser 120 and defines a gain volume when the gas is excited by a RF field. The gain volume is the hollow interior of dielectric cylinder 122.

An outside surface of dielectric cylinder 122 is concentric with a first surface 134 of a first electrode 124 and a second surface 136 of a second electrode 126. The first and second electrodes are located on opposite sides of the dielectric cylinder. First surface 134 and second surface 136 are separated by a diameter D. The first surface is separated from the outside surface of dielectric cylinder 122 by a first gap $d_3$. The second surface is separated from the outside surface of dielectric cylinder 122 by a second gap $d_4$. These small gaps are created by precision rods 128 located in longitudinal grooves machined into the surfaces of the dielectric cylinder and the electrodes. The diameters of precision rods 128 are selected to achieve desired gaps $d_3$ and $d_4$. Preferably, gaps $d_3$ and $d_4$ are least 0.001 D. More preferably, the gaps $d_3$ and $d_4$ are at least 0.0025 D. The rods are made of a dielectric material, preferably a ceramic material.

Although the embodiments presented here are within resonator arrangements, which include resonator mirrors for progressive amplification of laser radiation in multiple passes through a gain volume, the principles of the present invention may also be applied to amplifier arrangements. In a master-oscillator power-amplifier (MOPA) arrangement, the master oscillator is a laser resonator providing laser radiation to the power amplifier for further amplification. The power amplifier may include a gain volume containing a RF excited $CO_2$ or CO gas mixture, for scaling the pulse energy and average power of the laser radiation directed therethrough.

The present invention is described above in terms of a preferred embodiment and other embodiments. The invention is not limited, however, to the embodiments described and depicted herein. Rather, the invention is limited only by the claims appended hereto.

What is claimed is:

1. A radio-frequency excited gas laser, comprising:
a housing containing the gas;
a first electrode elongated along a longitudinal axis surface;
a second electrode elongated along the longitudinal axis and parallel to the first electrode, the first and second electrodes located in the housing and mutually separated by a distance D; and
a dielectric slab located between the first and second electrodes that defines a gain volume when the gas is excited by a radio-frequency field, the dielectric slab having opposite first and second surfaces parallel to the first and second electrodes;
wherein the first surface of the dielectric slab is separated from the first electrode by a first gap such that, where the dielectric slab and the first electrode have mutually-facing surfaces, less than 25% of the mutually-facing surfaces of the dielectric slab and the first electrode are in contact with each other, and the second surface of the dielectric slab is separated from the second electrode by a second gap such that, where the dielectric slab and the second electrode have mutually-facing surfaces, less than 25% of the mutually-facing surfaces of the dielectric slab and the second electrode are in contact with each other.

2. The radio-frequency excited gas laser of claim 1, wherein the first and second gaps are created by precision balls, each of the precision balls being in contact with the first electrode and the second electrode.

3. The radio-frequency excited gas laser of claim 2, wherein the precision balls are made of a ceramic material.

4. The radio-frequency excited gas laser of claim 1, wherein distance D is in a range between 2 millimeters and 6 millimeters.

5. The radio-frequency excited gas laser of claim 1, wherein the first gap is at least 0.001 D and the second gap is at least 0.001 D.

6. The radio-frequency excited gas laser of claim 5, wherein the first gap is at least 0.0025 D and the second gap is at least 0.0025 D.

7. The radio-frequency excited gas laser of claim 1, wherein lateral alignment of the dielectric slab is maintained by compressing the dielectric slab between at least two registration blocks and at least two preloaded spring assemblies, the registration blocks and the preloaded spring assemblies attached to opposite inside surfaces of the housing.

8. The radio-frequency excited gas laser of claim 1, wherein longitudinal alignment of the dielectric slab is maintained by at least one dowel pin, each of the at least one dowel pin passing through a hole through the dielectric slab and extending into a blind hole in each of the electrodes.

9. The radio-frequency excited gas laser of claim 1, wherein the second electrode is secured laterally and longitudinally by at least two dowel pins located in holes through the dielectric slab and corresponding blind holes in each of the electrodes.

10. The radio-frequency excited gas laser of claim 1, wherein an inductor assembly, a pair of insulating bars, and the second electrode are secured laterally by springs located on each side of the gas laser.

11. The radio-frequency excited gas laser of claim 10, wherein the springs extend longitudinally along the inductor assembly, the insulating bars, and the second electrode.

12. The radio-frequency excited gas laser of claim 10, wherein each spring provides a compressive force in a range between 65 and 105 Newton.

13. The radio-frequency excited gas laser of claim 10, wherein the springs are fingerstock springs.

14. The radio-frequency excited gas laser of claim 10, wherein the first and second gaps are created by precision balls, each of the precision balls being in contact with the first electrode and the second electrode, each spring pushing the inductor assembly, an insulating bar, and the second electrode against the precision balls.

15. The radio-frequency excited gas laser of claim 10, wherein each insulating bar is secured laterally by at least two dowel pins located in holes in the second electrode and corresponding holes in the insulating bar.

16. The radio-frequency excited gas laser of claim 10, wherein the inductor assembly is secured laterally and longitudinally by dowel pins located in holes in the insulating bars and corresponding holes in the inductor assembly.

17. The radio-frequency excited gas laser of claim 10, wherein each insulating bar extends into a volume between the second electrode and the housing, thereby increasing an electric potential necessary to strike a discharge therebetween.

18. The radio-frequency excited gas laser of claim 17, wherein the insulating bar occupies most of the volume between the second electrode and the housing, while being separated from both the second electrode and the housing.

19. The radio-frequency excited gas laser of claim 1, wherein the housing contains a carbon dioxide or carbon monoxide gas mixture.

20. The radio-frequency excited gas laser of claim 1, wherein a hollow in the dielectric slab defines the gain volume of a slab laser.

21. The radio-frequency excited gas laser of claim 1, wherein channels in the dielectric slab define the gain volume of a waveguide laser.

22. The radio-frequency excited gas laser of claim 1, wherein the first gap precludes contact between the dielectric slab and the first electrode, and the second gap precludes contact between the dielectric slab and the second electrode.

23. A radio-frequency excited gas laser, comprising:
a housing containing the gas;
a hollow dielectric cylinder located in the housing and oriented along a longitudinal axis, the dielectric cylinder defining a gain volume when the gas is excited by a radio-frequency field, the gain volume being the hollow interior of the dielectric cylinder;
a first electrode having a first surface that is concentric with an outside surface of the dielectric cylinder; and
a second electrode having a second surface that is concentric with the outside surface of the dielectric cylinder, the first and second electrodes located on opposite sides of the dielectric cylinder;
wherein, the first surface is separated from the outside surface by a first gap such that less than 25% of the first surface is in contact with the outside surface, and the second surface is separated from the outside surface by a second gap such that less than 25% of the second surface is in contact with the outside surface.

24. The radio-frequency excited gas laser of claim 23, wherein the first gap precludes contact between the first surface and the outside surface, and the second gap precludes contact between the second surface and the outside surface.

* * * * *